United States Patent Office 3,539,317
Patented Nov. 10, 1970

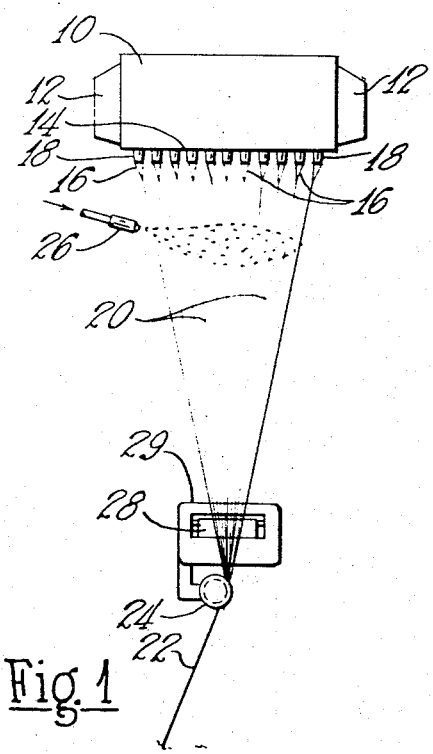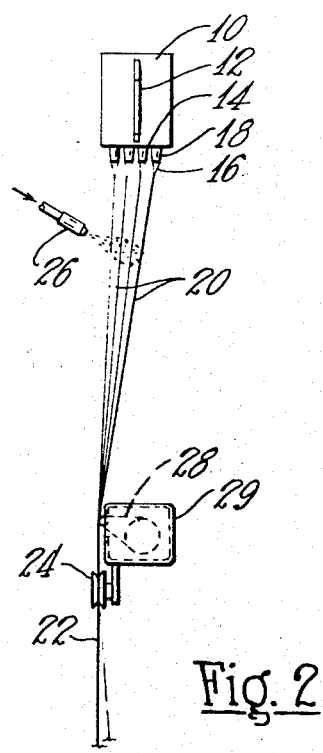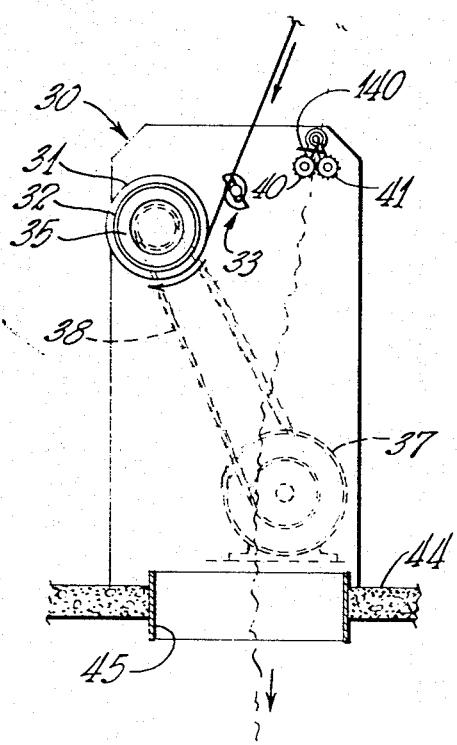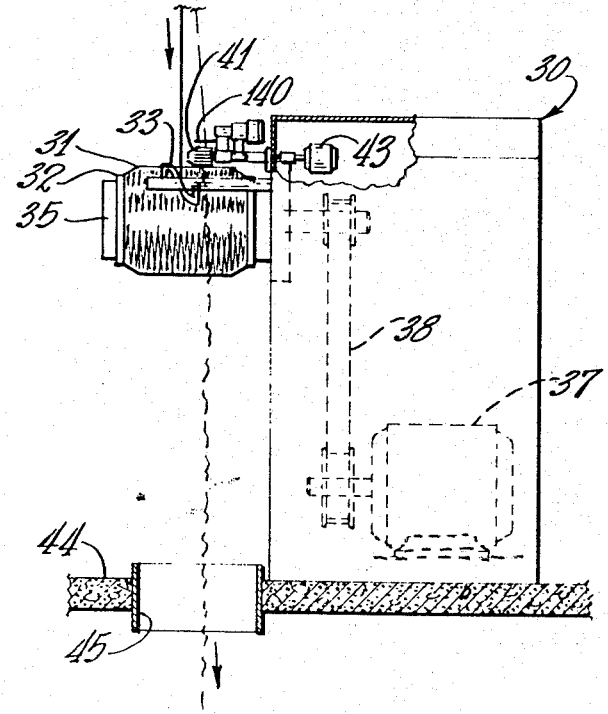

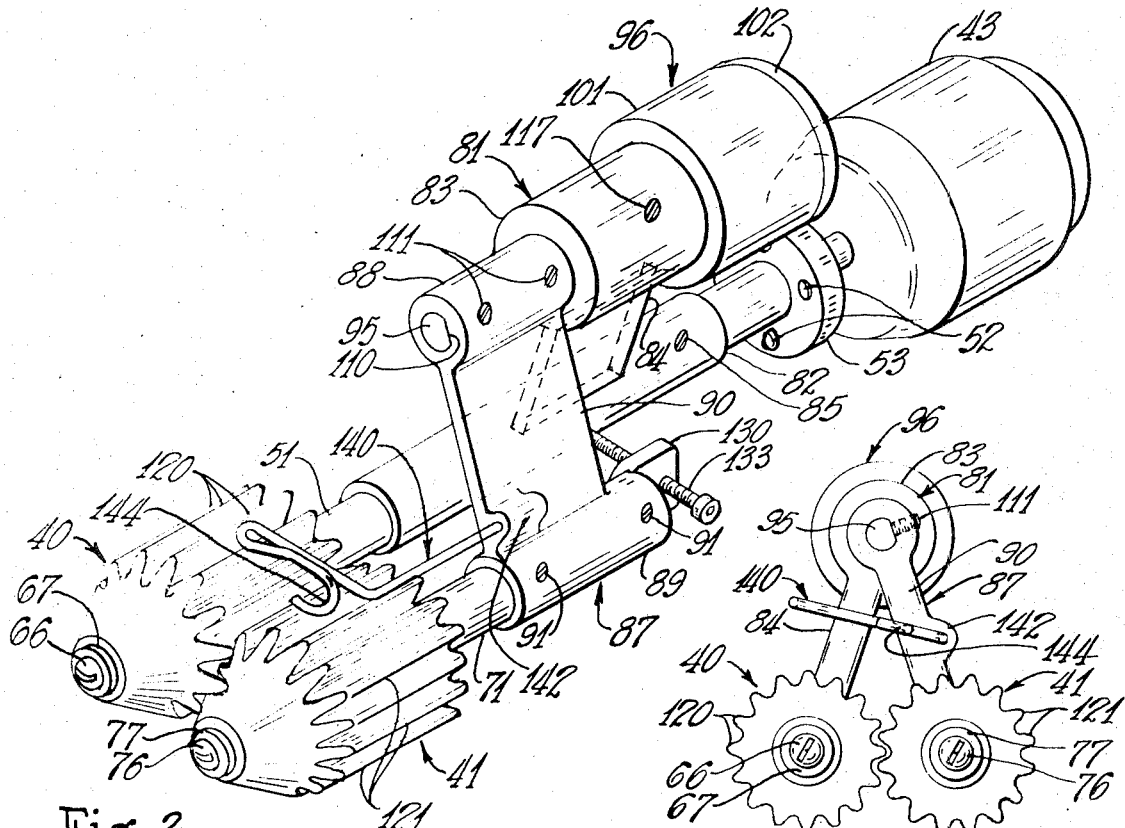
Fig. 3
Fig. 4
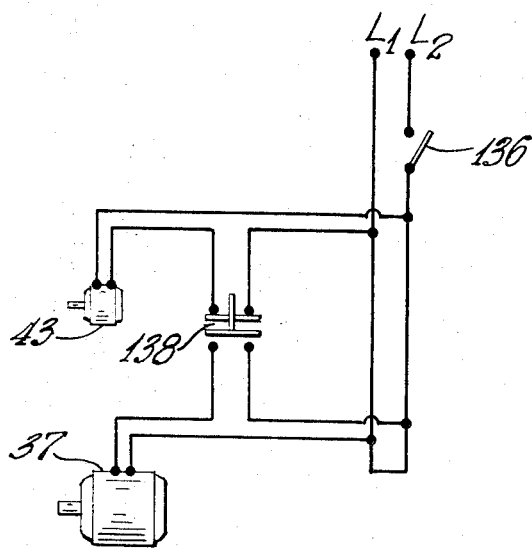
Fig. 9
INVENTOR
ROY E. SMITH
BY Staelin & Overman
ATTORNEYS

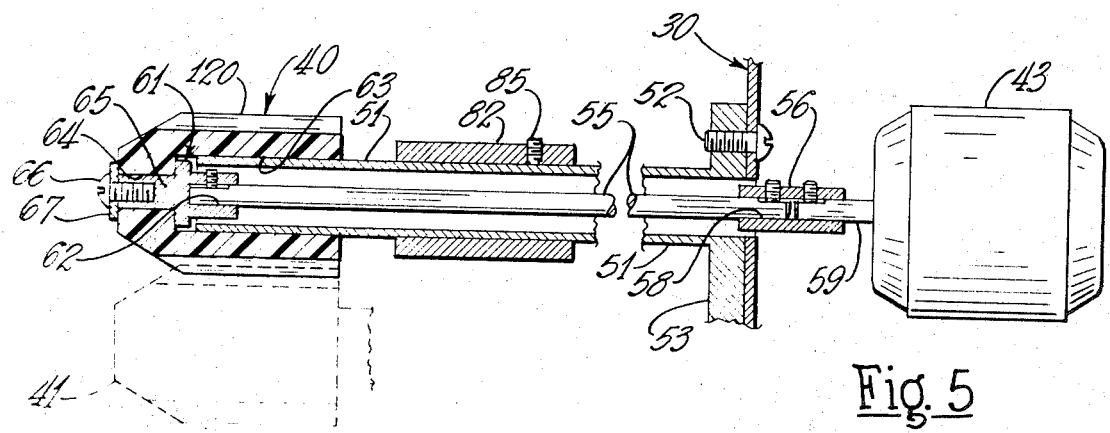

3,539,317
GLASS FIBER FORMING APPARATUS WITH ROLL MEANS FOR ADVANCING LINEAR MATERIAL
Roy E. Smith, Toledo, Ohio, assignor to Owens-Corning Fiberglas Corporation, a corporation of Delaware
Filed Nov. 21, 1967, Ser. No. 685,482
Int. Cl. C03b 37/02
U.S. Cl. 65—11                                                                 9 Claims

ABSTRACT OF THE DISCLOSURE

This invention pertains to an apparatus for forming a multiplicity of glass fibers from molten streams which has a collecting means such as a winding tube to attenuate the streams into fibers in combination with a pair of adjacent cooperating rolls spaced from the collecting means to advance the fibers when the collecting means is not attenuating the fibers.

BACKGROUND OF THE INVENTION

Continuous filament glass strands may be produced by flowing a multiplicity of molten streams from a feeder containing a supply or body of molten glass and then applying a pulling force to the individual streams sufficient to attenuate the streams into continuous filaments, which are combined subsequently into a strand. A winder packages the strand on a collector such as a tube. The collector acts as the attenuating means through high speed rotation provided by the winder. When the required amount of strand winds into a package on the collector, the winder discontinues the rotation of the collector, which gives rise to an interruption in the attenuation of the glass filaments long enough to permit an operator to interchange an empty tube collector for the full tube.

An interruption is detrimental to the process of forming continuous filament glass. The proper thermal conditioning of the molten glass for particular filament size and the like requires strict adherence for unformity of product; such conditioning tends to change during interruption times. Furthermore, if the filament attenuation is intermittant, the process must be started anew after each change of the collector. Such requires that an operator consume much time getting all the hundreds or even several thousands of streams of molten glass flowing properly from their feeder source by pulling the filaments over size applicators, gathering shoes and perhaps even strand splitters to ready the process to attenuate the streams into filaments.

Thermal conditioning of the molten glass and the difficulty of properly flowing and attenuating all the molten streams of glass into filaments arising from interruptions also pertains to the starting-up of a cold feeder prior to collecting the first wound package after commencing operations.

Because the practice of having operators draw the filaments from the streams by hand at start-up and between packages was not satisfactory, there arose the practice of employing a "secondary" means for advancing a strand such as cooperating rolls where one or both of the rolls are driven. During times of interruption the cooperating rolls advance a strand fed therebetween to substantially keep thermal continuity, etc.

At least two types of "secondary" strand advancing means, e.g. cooperating rolls, have heretofore been employed. One type of cooperating roll arrangement employs a pair of rolls having smooth outer peripheral surfaces in contact. A second arrangement employs two securely positioned rollers having peripheral surfaces fashioned with fine harsh teeth, which are intermeshed in operation. Such arrangements have not been altogether successful.

As the toothed rolls advance a strand, the engaging teeth tend to cut the filaments of the strand until none of the filaments are engaged in the rolls, the strand no longer being advanced.

"Roll wrap" limits the usefulness of cooperating rolls having smooth peripheral surfaces. As such rolls advance the strand, the strand tends to "lick" about the peripheral surface of one of the rolls after initially passing between them until a loop or "licked" portion of the strand is thrown between the rolls again with traveling strand initially entering between them. The strand builds on the roll upon which the "licking" occurred similarly to a package until the strand entangles and breaks, the strand no longer being advanced.

The construction of these prior art roll arrangements rigidly fixes the rolls with respect to each other in working contact relationship. Such rigid construction further complicates the job of advancing strands. There may be sudden variations in the size of the filament bundle or strand, a situation not uncommon in the production of glass filaments. Such variations tend to clog and stop the rolls.

SUMMARY OF THE INVENTION

An object of the invention is improved apparatus for advancing linear material.

Another object of the invention is improved apparatus associated with a winder employed to advance linear material such as continuous filament glass strands in the filament forming process at times of operation during which there are interruptions in the collection of the strand or prior to collecting the first strand package at start-up.

Another object of the invention is apparaus providing a "secondary" means for advancing such material associated with a winder that continuously advances such material without parting the material during the advancing process.

Still another object of the invention is apparatus providing a "secondary" means for advancing linear material associated with a winder that precludes "roll wrap."

Yet another object of the invention is apparatus for advancing linear material, especially scrap material, having substantial size variations along its length.

These and other objects are attained through the use of apparatus for advancing linear material that includes two cooperating moving surfaces such as two cooperating rolls having large rounded teeth on their peripheral surface where the rolls are usually lightly urged or biased towards each other in modified meshing relationship that permits only partial penetration of the teeth into the grooves or flukes between the teeth, normal or full engagement being precluded. The objects are further promoted by the apparatus through use of structure that permits the rolls to move laterally with respect to each other as material of varying size passes therebetween.

Other objects and advantages of the invention will become apparent as the invention is described hereinafter in more detail with reference made to the accompanying drawings.

DESCRIPTION OF THE DRAWINGS

FIG. 1 is a somewhat diagrammatic front elevation view of the apparatus of the invention employed on a winder packaging continuous filament glass strands at a forming position. The dotted line indicates the path of the strand during times when the strand advances by the action of the apparatus according to the principles of the invention;

FIG. 2 is a side elevation view of the apparatus illustrated in FIG. 1;

FIG. 3 is an enlarged perspective view of apparatus for advancing linear material according to the principles of the invention that appears in FIGS. 1 and 2;

FIG. 4 is an end elevation view of the apparatus as illustrated in FIG. 3;

FIG. 5 is a view in longitudinal section of the portion of the apparatus shown in FIGS. 3 and 4 that includes the drive system and driven roll according to the principles of the invention and further illustrating by the dotted lines the modified meshing relationship of the rolls.

FIG. 6 is a view in longitudinal section of the portion of the apparatus shown in FIGS. 3 and 4 that includes the idler arrangement and idler roll according to the principles of the invention;

FIG. 7 is a view in longitudinal section of that portion of the apparatus shown in FIGS. 3 and 4 that provides the lightly biasing or urging force pressing the toothed rolls together according to the principles of the invention;

FIG. 8 is a section taken along the lines 8—8 in the direction of the arrows and shows a spring employed with the apparauts according to the principles of the invention; and FIG. 9 is a somewhat schematic illustration of a simple control system operating two drive means of the apparatus according to the principles of the invention.

DESCRIPTION OF THE PREFERRED EMBODIMENTS

While the invention is particularly valuable in processes for forming filaments of heat softened mineral material such as glass where individual continuous filaments are combined to form a strand prior to collecting the material as a wound package, the invention may be used in forming process and subsequent manufacturing steps involving textile material made from other fiber-forming materials such as thermoplastic, chemical and natural fibers. Thus, the use of glass to explain the operation of the invention is by example only, the invention having utility in other textile operations.

FIGS. 1 and 2 show a process for forming continuous glass filaments from heat-softened glass where the glass filaments are combined in a strand, which is subsequently collected as a wound package. The FIGS. 1 and 2 illustrate a container or feeder 10 that holds a supply of molten glass. The container 10 may connect to a forehearth (not shown) that supplies molten glass from a furnace or may connect to a means for supplying glass (not shown) such as glass marbles that are reduced to a heat softened condition in a melter or other means associated with the feeder or container 10. Located at the ends of the container 10 are terminals 12 that connect to a source of electrical energy to supply heat by conventional resistance heating to the giass held in the container 10 to maintain the molten glass at a proper fiber-forming temperature and viscosity. Moreover, the container 10 has a bottom or tip section 14 that includes a plurality of orifices or passageways for delivering streams 16 of the molten glass from the container 10. As shown, the openings in the bottom 14 comprise a plurality of depending orificed projections or tubular members 18.

The molten streams 16 are attenuated in individual continuous glass filaments 20 and combine into a strand 22 by a gathering shoe 24 located below the container 10.

While the filaments 20 may be protected only by application of water to them, it is desirable in most instances to apply to them a conventional size or other coating material. A nozzle 26 may be located near the bottom 14 to spray water onto the newly formed filaments 20, preferably prior to combining the filaments 20 into the strand 22. An applicator 28 supported within a housing 29 may be provided as shown in FIGS. 1 and 2 to apply the size or other coating material to the filaments 20. The applicator 28 may be any suitable means known to the art such as an endless belt that moves to pass through the size or coating fluid held in the housing 29. As the filaments 20 pass across the surface of the applicator 30, some of the fluid material on the applicator 28 transfers to them.

The strand 22 collects as a wound package 31 on a winder 30. Strand handling apparatus 33 moves the advancing strand 2 back and forth along the length of the package 31 as the strand winds upon a collector such as tube 32 that has been telescoped over a spindle or collet 35, the collet 35 being journaled for rotation on the winder 30. A motor 37 located within the winder 30 appropriately rotates the collet 35 through a non-slipping belt 38. Appropriate conventional means (not shown) moves the strand handling apparatus 33.

While the apparatus of the invention shown in FIGS. 1 and 2 illustrates a process for attenuating continuous filament glass and subsequently combining them into a single strand 22, the invention may be employed with more than one strand.

Associated with the winder 30 is a "secondary" advancing means or "pull roll" assemblage suitable for advancing linear material such as the glass strand 22. The apparatus as illustrated in FIGS. 1 and 2 functions during operating periods that the strand 22 does not wind on the tube 32. The assemblage includes a driven roll 40 and a cooperating idler roll 41 in working contact, the roll 40 being directly driven by a motor 43 located within the winder 30. During glass fiber-forming operations such as start-up and between packages when the strand 22 does not collect as a package on the collet 35, an operator introduces the strand 22 between the cooperating moving surfaces of the rollers 40 and 41, which rotate together to advance the strand 22 downwardly at a speed somewhat slower than the speed of attenuation. The strand 22 can travel at speeds of attenuation up to 10,000 feet per minute or faster. The rolls 40 and 41 advance the strand 22 into a scrap collection zone through an opening in the floor 44 such as a scrap chute 45 disposed below the rolls. The dotted line in FIGS. 1 and 2 indicates a strand path from the rolls 40 and 41 to the scrap chute 45. The strand 22 directed through the scrap chute 45 collects in a container (not shown) for succeeding disposal.

The "pull roll" assemblage includes a drive unit and an idler unit joined by a connecting arrangement providing means normally lightly urging or biasing the rollers 41 and 42 towards each other.

Referring to FIGS. 3 through 5, the drive unit in a sense is a cantilever unit that includes support structure and a drive system. The support structure includes a drive tube 51, which as illustrated extends horizontally from the cover of the winder 30. In the embodiment shown, the drive tube 51 secures suitably to the cover of the winder 30 such as by screws 52 holding a flange 53 of the tube 51 and the cover together. The drive system includes a drive shaft 55 extending lengthwise in the drive tube 51. The motor 43 connects to one end of the drive shaft 55 through a coupling unit 56 having a passageway 58 extending through it that receivingly accommodates both the end of the shaft 55 and the motor output shaft 59. The other end of the drive shaft 55 connects to a roll coupling unit 61, which connects the driven roll 40 with the drive shaft. The end of the drive shaft fits into a recess 62 of the coupling 61. The coupling unit 61 includes a longitudinal portion 65. The driven roll 40 rotatably mounts on the free end of the drive tube 51. As illustrated the bearing surface for the driven roll 40 is the outside surface of the drive tube 51. A two section passageway extends lengthwise through the driven roll 40. A first section 63 is of larger diameter and extends from the base of the roll 42 to terminate intermediate the ends of the roll 40. The free end of the drive tube 53 fits into the section 63. From the termination of the section 63 a passageway section 64 of smaller cross section extends to open on the end of the roll 40. The section 64 has a square transverse cross section. The longitudinal portion 65 of the coupling unit 61 has a square transverse cross-sectional configuration and extends through the passageway section 64 in sung relationship to terminate at the end surface of the roll 40. A screw 66 threads lengthwise from the outer end of the portion 65 and in combination with a retaining washer 67 secures the roll 40 to the drive system, i.e. drive shaft 55 through the coupling 61. The roll 40 rotates on the end of the drive tube 51 through the rotating movement of the drive shaft 55 provided by the motor 43.

Referring to FIGS. 3, 4 and 6, the idler unit has a construction similar to the drive unit. The roll 41 rotatably mounts on an end of an idler support tube 71, which itself mounts on the connecting arrangement discussed in detail hereinafter. An idler shaft 73 extends lengthwise within the idler support tube 71. A thrust bearing 74 appropriately maintained at a determined position within the tube 71 secures one end of the idler shaft 73. The idler shaft 73 pierces the thrust bearing 74. The bearing piercing end of the shaft 73 has threads on which a nut 75 secures the shaft 73 in position with the thrust bearing 74. The other end of the idler shaft 73 connects to a roll coupling 78, which is identical to the coupling 61. A screw 76 and a retaining washer 77 complete the connection of the roll 41 to the coupling 78 in the same way that the screw 66 and retaining washer 67 connect the coupling 61 to the driven roll 40.

Referring to FIGS. 3, 6 and 7, the connecting arrangement between the drive unit and the idler unit is a hinged unit comprising several parts. A mounting collar 81 fits on the drive tube 51 and comprises a tubular portion 82, a tubular portion 83 and an extension arm 84. The tubular portion 82 telescopes over the drive tube 51 in snug rotatably mounted relationship. The extension arm 84 projects radially from the outer surface of the tubular portion 82 at one end and holds at its other end the tubular portion 83, which extends in spaced relation parallel to the tubular portion 82. The mounting collar 81 may be rotated 360 degrees about the drive tube 51, i.e. its axis of rotation. Appropriate means such as set screw 85 maintains the extension arm 84 and tubular portion 83 at desired position on the drive tube 51. The connecting arrangement uses a second collar 87 that includes a tubular portion 88, a tubular portion 89 and an extension arm 90. As in the case of the mounting collar 81, the tubular portions 88 and 89 are maintained in supported spaced relation on the ends of the extension arm 90, which proceeds radially from the tubular portions. The idler support tube 71 telescopes in snug relation into the tubular portion 89 of the idler collar 87 and is supported thereon. Suitable means such as set screws 91 keep the idler support tube 71 rigidly fixed within the tubular portion 89. A spring rod 95, which is a part of a means for lightly urging the idler roll 41 against the driven roll 40, extends through the tubular portions 83 and 88 to connect the mounting collar 81 and the idler collar 87. The tubular portions 83 and 88 move about the axis of rotation of the rod 95 in hinge-like fashion.

Associated with the connecting arrangement is a load assembly 96 that yieldably urges the idler roll 41 into light pressing relationship with the driven roll 40. The load assembly 96 includes a spring drum 101, a drum cap 102, a load spring 104, a screw 105 and the spring rod 95. Referring to FIGS. 3 and 7, the spring drum 101 comprises a larger open end portion 106 and a tubular portion 107, the tubular portion 83 of the mounting collar 81 being telescoped over the tube portion 107. Thus, the spring drum 101 mounts on the mounting collar 81.

The drum cap 102 appropriately secures across the open end of the larger portion 106 of the spring drum 101 to form a working chamber 103.

The spring rod 95 holds together the spring drum 101, the mounting collar 81 and the idler collar 87. As illustrated in FIG. 7, the rod 95 has a larger portion 109 at one end and has a flat side 110 at the other end. While the spring rod 95 can move about its axis in the tubular portion 107 of the spring drum 101 without distrubing the mounting collar 81, the idler collar 87 pivots with the rotational movement of the spring rod 95. Suitable means such as set screws 111 thread tightly against the flat surface 110 of the rod 95 through the tubular portion 88 to hold the spring rod 95 in fixed relationship with the idler collar 87. As the spring rod moves about its axis the tubular portion 89 of the idler collar 87 changes position to move the idler roll 41 laterally with respect to the driven roll 40.

As illustrated in FIGS. 7 and 8 the load spring 104 acts on the spring rod 95 to press or urge the idler roll 41 towards the driven roll 40 into lightly pressed relation with it. As shown the load spring 104 includes a radially outwardly extending end 113 and an inwardly extending portion 114 and is of suitable size to fit over the larger end 109 of the rod 95. The inwardly extending portion 114 of the spring 104 fits into a slot or passageway 116 fashioned at the outer end of the portion 109. The screw 105, which extends through the working chamber 103 of the spring drum 101, provides a surface against which the radially outwardly extending potrion 113 of the spring 104 may contact.

Movement of the spring drum 101 about its axis of rotation loads the spring 104, which gives rise to torsional forces in the spring rod 95 that moves the idler roll 41 towards the driven roll 40 in lightly urged together relationship. As the spring drum 101 rotates, the radially extending portion 112 of the spring 104 contacts the screw 105, the inwardly extending portion 114 being held in the slot 116. As the spring 104 resists the movement of the spring drum 101, it transfers torsional force to the rod 95. A desired urged together relationship between the rolls 40 and 41 can be maintained by fixing the spring drum 101 in determined rotated position with respect to the spring 104 by means of set screw 117, which is tightly threaded against the tube portion 107 of the spring drum 101 through the wall of the tubular portion 83. In practice the biasing force such as by the spring 104 acting through the spring rod presents a force in the range of from less than one pound to fifteen pounds or higher between the rolls 40 and 41. A force of six to eight pounds is preferred depending upon the process. It may be in some instances that only the weight of the roll 41 and collar 87 urging against the roll 40 may be enough to operate the apparatus.

The driven roll 40 and the idler roll 41 are longitudinal or cylindrical members that have gear-like peripheral surfaces comprising teeth 120 and 121 respectively. Thus, in a sense the rolls 40 and 41 are gears where the teeth 120 and 121 are longitudinal members or ribs extending radially from the periphery of the rolls. Further, it has been preferable to employ teeth that extend parallel along the length of the rolls in straight line fashion. In practice the rolls normally have only a small number of larger size teeth, from twelve to sixteen, and these teeth are rounded at their outer ends or edges to preclude chewing the glass strand as the teeth cooperate to engage the strand to advance it.

While any suitable material such as metal or plastic has utility for making the rolls 40 and 41, in practice a moldable material such as glass fiber reinforced polyesters are normally employed to make the rolls.

Although the rolls 40 and 41 are maintained in lightly urged together relationship, the apparatus employs means precluding normal meshing engagement of the teeth 120 and 121. As clearly shown in FIGS. 3 and 6 the tubular portion 89 of the collar 87 has a mounting extension 130 with a threaded opening 131 through which an adjusting screw 133 threads. When the apparatus of the invention is in operating position, the threaded end of the screw 133 abuts against the surface of the tubular portion 82, which is disposed on the drive tube 51. While the screw 133 can turn to laterally position the roll 41 closer or further away from the roll 40 to permit more or lessor engagement of the teeth 120 and 121 for particular strand sizes, in practice the apparatus normally operates with the teeth 120 and 121 extending for working contact from one-half to two-thirds the depth of the space between the teeth. As illustrated in FIGS. 4 and 5, such modified tooth penetration leaves considerable clearance between the rounded ends or edges of the teeth (120, 121) and the bottom of the spaces.

When the apparatus of the invention is used on a winding machine such as winder 30, it operates only at those times the strand 22 does not wind upon a collector held on the winder 30. FIG. 9 shows a simplified and somewhat schematic electrical circuit controlling the operation of the apparatus of the invention. Electrical power provided to leads L and L supplies the motors 43 and 37 through a main switch 136. A control switch 138 operates to complete the electrical circuit to either the motor 37 for the winder 30 or the motor 43 for the "pull roll" assembly, but not both.

In operation at start-up or between packages 31 the control switch 138 is moved, either manually or by an appropriate mechanism, to provide electrical power to start the motor 43, electrical power to the motor 37 being precluded. As the rolls 40 and 41 rotate, the operator introduces the strand 22 between the rolls. The rolls 40 and 41 (i.e. the teeth 120 and 121) engage the strand 22 to advance the strand 22 downwardly into the scrap chute 45. While the r.p.m. of the rolls in such that the strand 22 normally advances at a linear rate in the range of from 200 to 400 or more feet per minute, the requirements of a particular process establishes the advancing speed requirements for the strand.

The strand conforms to the engaging teeth 120 and 121 of the rolls 40 and 41, which cooperate to move the strand 22 substantially without slipping. The light pressing force urging the rolls 40 and 41 together keep the strand engaged between the teeth 120 and 121 in a sinuous path. If a sudden variation in strand size should occur such as a strand zone containing hot gas beads or a larger bundle size of filaments, etc., the roll 41 moves against the force of the spring 104 and away from the roll 40, a yieldable urging together of the rolls being maintained by the biasing force of the spring 104. After the larger bundle of filaments (i.e. strand portion) passes between the rolls 40 and 41, the roll 41 moves under the influence of the spring 104 towards the roll 41. The strand 22 advances without interruption.

It has been useful to employ a guide for the strand. As shown in FIGS. 3 and 4 the apparatus uses a longitudinal strand guide 140 held at one end of a raised portion 142 of the extension arm 90. The strand guide 140 extends from the raised portion 142 along a path spaced from the teeth engaging zone of the rolls 40 and 41 to a location substantially midway along the length of the teeth 120 and 121. At such spaced apart location the guide 140 has an arcuate hook-like portion 144 across which the strand(s) 22 passes. The guide 140 is especially helpful when the apparatus advances more than one strand. The guide 140 gathers the strand(s) to direct the strand(s) between the rolls 40 and 41 without the strand(s) becoming entangled with them.

It is apparent that, within the scope of the invention, modifications and different arrangements may be made other than as herein disclosed. The present disclosure is merely illustrative, the invention comprehending all variations thereof.

What is claimed is:

1. Apparatus for advancing a glass strand comprising:
   a container holding heat softened glass, the container having orifices for flowing a plurality of streams of the glass for attenuation into continuous fibers;
   means for gathering the continuous fibers into a strand;
   a frame;
   a rotatably mounted collector on the frame for collecting the strand into a wound package;
   means for rotating the collector;
   a pair of substantially cylindrical rolls for engaging the strand when introduced between them during times when the strand is not accumulating on the collector, the rolls being spaced laterally from the collector, each of the rolls having a plurality of teeth extending outwardly from its peripheral surface and proceeding lengthwise thereon;
   support means on the frame rotatably holding the rolls, the support means including two connected units permitting the rolls to move laterally relative to each other;
   spring biasing means associated with the support means urging the rolls towards each other; and
   means for driving at least one of the rolls in rotation.

2. Apparatus according to claim 1 further including means establishing a predetermined meshing relationship with the rolls.

3. Apparatus according to claim 2 further including means adjacent to the rolls guiding the strand between them.

4. Apparatus for producing glass strand comprising:
   means supplying molten glass streams;
   primary means for attenuating the glass streams into glass filaments;
   means for gathering the glass filaments into a strand, the primary attenuating means advancing the strand along a path and collecting the strand as a wound package; and
   interim means for advancing the strand along another path to a separate collection zone during times the primary means is not advancing the strand, the interim means being spaced from the primary means and comprising a pair of rotatably mounted adjacent cooperating rolls for engaging the glass strand introduced between them, the rolls being mounted to permit movement laterally relative to each other, means for driving at least one roll in rotation, and means for yieldably urging the rolls towards each other into engaging relation with the glass strand introduced therebetween.

5. Apparatus according to claim 4 where each of the rolls has a plurality of teeth extending from its peripheral surface.

6. Apparatus for producing glass strand comprising:
   means for supplying molten glass streams for attenuation into continuous glass filaments;
   a frame;
   primary means on the frame for attenuating the glass streams into continuous filaments;
   means for gathering the filaments into a glass strand, the primary means collecting the glass strand as a wound package; and
   interim means on the frame for attenuating the glass streams into continuous glass filaments and advancing the glass strand at a slower linear strand speed than the primary means, the interim means being used at times when the primary means is not collecting the glass strand, the interim means being spaced from the primary means and comprising a pair of substantially cylindrical rolls, each of the rolls having a plurality of teeth extending outwardly from its peripheral surface and proceeding lengthwise thereon, a first support member on the frame, one of the rolls rotatably mounted on the first support member, a second support member, the other roll rotatably mounted on the second support member, means connecting the first and second support members for disposing the rolls in engaging relationship with glass strand introduced therebetween, the connecting means permitting the rolls to move laterally relative to each other, means yieldably urging the rolls toward each other, means keeping the teeth in predetermined relationship precluding normal meshing relationship of the teeth, and means for driving at least one of the rolls in rotation.

7. Apparatus according to claim 6 wherein the teeth have rounded ends.

8. Apparatus according to claim 6 where the means connecting the support members include two collar members, one collar member being pivotally mounted to move one of the rolls laterally relative to the other roll.

9. Apparatus according to claim 6 where the means urging the rolls toward each other is a spring.

References Cited

UNITED STATES PATENTS

| | | | |
|---|---|---|---|
| 1,185,260 | 5/1916 | Stine | 226—177 |
| 2,230,272 | 2/1941 | Slayter | 65—11 |
| 2,332,274 | 10/1943 | Slayter | 65—1 |
| 2,348,182 | 5/1944 | Slayter | 65—11 |
| 3,116,531 | 1/1964 | Hills et al. | 226—190 |
| 3,392,896 | 7/1968 | Ullman | 226—187 |

S. LEON BASHORE, Primary Examiner

R. LINDSAY, JR., Assistant Examiner

U.S. Cl. X.R.

226—177, 187, 190